Figure 1:
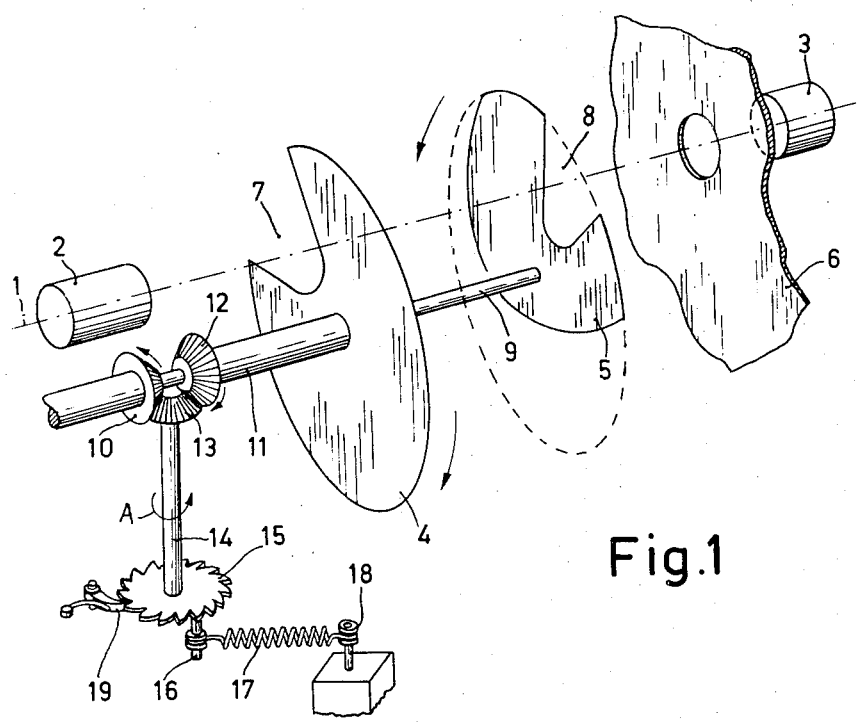

United States Patent [19]
Gaullier

[11] 3,820,145
[45] June 25, 1974

[54] SHUTTER FOR PHOTOGRAPHIC CAMERA
[75] Inventor: Pierre Gaullier, Houilles, France
[73] Assignee: U. S. Philips Corporation, New York, N.Y.
[22] Filed: May 17, 1973
[21] Appl. No.: 361,192

[30] Foreign Application Priority Data
May 18, 1972  France .............................. 72.17874

[52] U.S. Cl. .............................. 354/250, 352/208
[51] Int. Cl. ............................................ G03b 9/14
[58] Field of Search .......... 95/59, 62; 352/209, 208, 352/215, 218

[56] References Cited
UNITED STATES PATENTS
1,800,088  4/1931  Debrie ................................ 352/209
2,347,700  5/1944  Aronoff ............................... 95/59 X
2,788,704  4/1957  Habis ................................... 95/59 X
3,300,271  1/1967  Yamamoto ...................... 352/209 X FOREIGN PATENTS OR APPLICATIONS
275,661  5/1928  Great Britain ....................... 352/215
168,987  5/1965  U.S.S.R. ................................... 95/59

Primary Examiner—Joseph F. Peters
Attorney, Agent, or Firm—Frank R. Trifari

[57] ABSTRACT

This shutter consists of two closely spaced discs, each provided with an aperture and arranged so that the apertures, when they coincide, are located on the optical axis of the objective. These discs are driven by a shaft which is integral with a crank, whose crank pin is attached to a spring. The apertures coincide when during an exposure the discs have their maximum speed of rotation.

4 Claims, 2 Drawing Figures

PATENTED JUN 25 1974 3,820,145

SHUTTER FOR PHOTOGRAPHIC CAMERA

The invention relates to a between-lens shutter consisting of two closely spaced discs, each provided with an aperture and arranged so that upon coincidence the apertures are located on the optical axis of the objective of a photographic camera. The two discs are rotated in opposite directions by means of a mechanism which is controlled by a single shaft.

Shutters of the abovementioned type are known; and mainly used in aerial photographic equipment of the type called "cartographic camera."

Such equipment should be capable of providing high quality negatives; as a result of the mobility of the base, the exposure times are rather short, for example, of the order of magnitude of 1/200 to 1/800 sec. To obtain good negatives, it is important that, during these short instants, as much light as possible fall onto the film, i.e. that the shutter obtains its maximum aperture in a time which is megligible with respect to the exposure time.

With the known shutters, the shaft is permanently driven by a motor. In order to prevent the apertures in the discs from coinciding several consecutive times while making a single exposure, a complicated construction is required, using either additional discs, which rotate more slowly, or more blades or both.

Because of this additional structure the thickness of the shutter increases, so that the two optical systems located on either side of the shutter are spaced further apart. This greater spacing renders the calculation of the objectives more difficult, so that their quality is likely to be impaired.

It is an object of the invention to provide a between-lens shutter of simple and inexpensive design, whose performance renders it suitable for use in a "cartographic camera."

The shutter according to the invention is characterized in that said shaft is integral with a crank, which is connected to a device with a return spring which is tensioned when the shutter is tensioned. When the apertures coincide the spring is fully relaxed. The crank is attached to an anti-return device, so that said shaft can rotate in one direction only.

An embodiment of the invention will now be described, by way of example, with reference to the drawing.

Figure 2:
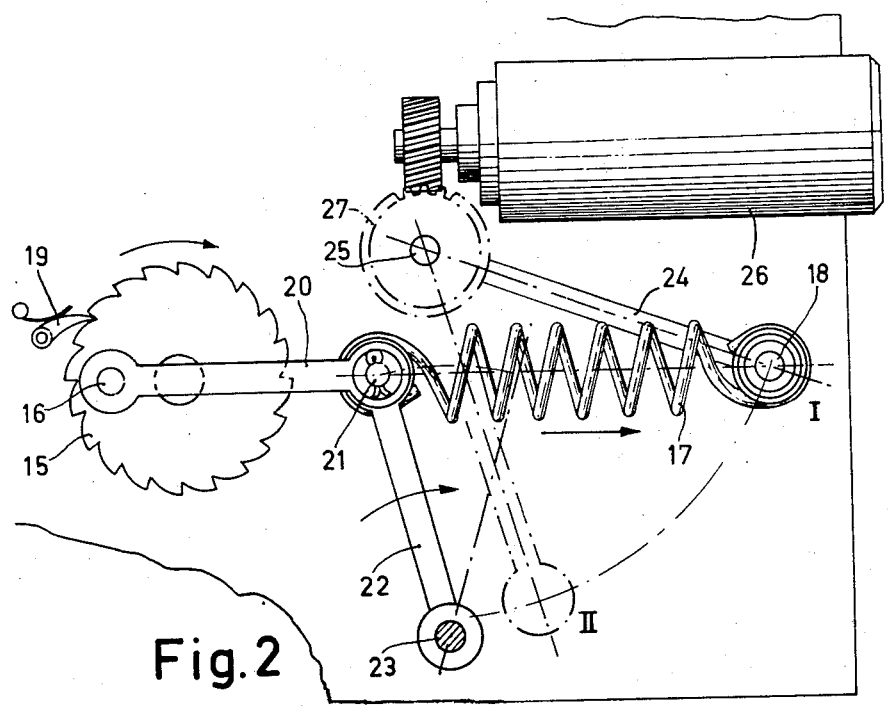

FIG. 1 is an exploded perspective view of a shutter according to the invention, and FIG. 2 shows a mechanism with which the exposure time can be varied.

FIG. 1 shows an optical axis 1 of the objective of a photographic camera; this objective consists of at least two optical systems 2 and 3. Two discs 4 and 5 as well as a diaphragm 6 are interposed between these two systems. Each disc has an aperture: 7 for disc 4 and 8 for disc 5. When these apertures coincide, the light from e.g. the optical system 2 can reach the diaphragm 6 and hence a portion of the light passes through the optical system 3 and falls onto the film.

The disc 5 is driven by a shaft 9 which is rigidly connected to a gear-wheel 10. The disc 4 is driven by a shaft 11 which is connected to a gear-wheel 12.

The shaft 11 is hollow, so that the two shafts 9 and 11 are co-axial and can rotate independently of each other.

The two gear-wheels 10 and 12 are driven by another bevel gear wheel 13 which is rigidly secured to a main shaft 14; rotation of this shaft causes the two discs 4, 5 to rotate in opposite directions.

According to the invention a crank is located at the end of the shaft 14, said crank being formed by a radius of a gear-wheel 15 and a pin 16; attached to this pin is a return spring 17 which at its other end is attached to a fixed point 18. The assembly is constructed so that when the apertures 7 and 8 coincide the axis of the wheel 15, the pin 16 and the point 18 are in line, in this order, the spring 17 then being in the fully relaxed position; moreover, the crank is attached to an anti-return device, which consists of a gear-wheel 15 and a ratchet 19.

The operation of the shutter according to the invention is as follows: with the aid of a tensioning mechanism, not shown and not being an essential feature of the invention, the spring 17 is tensioned by moving the pin 16 in the direction of the arrow A into a position such that the pin 16, the shaft of the gear-wheel 15 and the fixed point 18, in this order, are substantially in line; in actual fact, the pin 16 is positioned so as to be located slightly beyond the inline position, so that the force exerted by the spring 17 always causes the shaft 14 to rotate in the indicated direction of arrow A.

The tensioning mechanism keeps the shaft 14 blocked; when making an exposure, the shaft 14 is unblocked and begins to rotate; when the spring is in the almost fully relaxed position, the rotation speed of the discs 4 and 5 is greatest and the apertures 7 and 8 will coincide, light falling through the objective under the influence of the kinetic energy, obtained by the relaxation of the spring 17, the discs 4 and 5, although the spring is relaxed, continue to rotate with near-maximum speed. Closure takes place, the spring 17 is being re-tensioned and, when the speed of rotation of the discs becomes zero, might cause the assembly to move in the opposite direction; to obviate this effect, the pawl 19 is provided, which engages the teeth of the wheel 15 (anti-return device).

In order to obtain a rotational speed of the discs 4 and 5 as high as possible the moment of inertia of the shutter should be as small as possible. For this purpose, one of the shutter discs disc 5, in FIG. 1, may be cut away as much as possible.

The invention also provides a suitable embodiment of a device which enables the exposure time to be varied; this device is shown in FIG. 2, in which like parts have the same reference numerals as those in FIG. 1.

The exposure time is determined by the speed of rotation of the discs at the instant that the disc apertures coincide; to vary said time interval, it suffices to change the force exerted by the spring.

In FIG. 2 the pin 16 is connected to one end of a rod 20; arranged at the other end of this rod is a movable pin 21 to which one end of the spring 17 and one end of another rod 22 are attached; the other end of the rod 22 is connected to a fixed pivot 23; thus the movable pin 21 is always forced to perform the same movement when the gear-wheel 15, which takes along the pin 16, performs a revolution.

The point of attachment 18 of the spring 17 is integral with the end of a third rod 24; the location of the point 18 determines the exposure time; this location can be changed by rotating the rod 24 about an axis 25;

this rotation is caused by a device 26 with the aid of mechanism 27.

The point 18 describes a path as represented by a dash-dot line and may assume extreme positions I and II.

By means of the tensioning mechanism, not shown, the pin 16, the shaft of the gear-wheel 15 and the movable pin 21 are substantially aligned.

When the point 18 is in the position marked I, the spring is virtually in line with the rod 20, so that the full spring force is exerted on the pin 16; when the pin 16 has made half a turn, the shutter speed will be a maximum.

When the point 18 is in the position marked II, the spring extends in a direction substantially perpendicular to the rod 20, so that the full spring force no longer acts on the pin 16, the remainder being absorbed by the fixed stud 23 by reaction. On the other hand, the point 18 has come closer to the movable shaft 21, so that the spring is tensioned less tightly in the tensioned condition, which reduces the spring force.

These two means, the change of direction of the spring and its relaxation, enable the exposure times to be varied in suitable proportions.

What is claimed is:

1. A shutter mechanism arranged between two lenses of a photographic camera comprising first and second discs rotatably mounted and closely spaced between said lenses, an aperture in each of said discs arranged so that upon coincidence said apertures are located on the optical axis of the camera objective, means connected to each of said discs for rotating said discs in opposite directions, a shaft connected to said rotating means for driving same, a crank connected to said shaft, a return spring connected to said crank, means for turning said crank so as to tension said return spring when tensioning said shutter, said return spring being in the fully relaxed position when said apertures coincide, and an anti-return device connected to said crank so that said shaft can rotate in only one direction.

2. The shutter mechanism according to claim 1 wherein one of said discs is cut-away as much as possible to lower the moment of inertia of said shutter.

3. The shutter mechanism according to claim 1 further including means for varying exposure time comprising a first rod one end of which is attached to said crank, a movable pin attached to the other end of said first rod, one end of said return spring attached to said movable pin the other end thereof attached to a connection point, a second rod being fixed at one end thereof and attached at the other end thereof to said movable pin so as to cause said movable pin to describe a given path, means for adjusting the position of said connection point so as to vary the tensioning force of said return spring comprising a third rod connected at one end thereof to said connection point and at the other end thereof to a pivot point defining an axis about which said connection point is adjustable.

4. The shutter mechanism according to claim 3 further comprising means for rotating said third rod about said pivot point so that when said first rod is arranged substantially in line with said return spring said spring will exert the largest force on said crank when tensioned so as to cause the shortest exposure time, and so that when said third rod is rotated so that said return spring is arranged substantially perpendicular to said first rod said return spring will exert the smallest force on said crank when tensioned so as to cause the longest exposure time.

* * * * *